UNITED STATES PATENT OFFICE.

WILLIAM H. GILLEN, OF MILWAUKEE, WISCONSIN.

PROCESS FOR DECOMPOSING FELDSPAR AND OTHER POTASH-BEARING SILICIOUS MINERALS.

1,215,518.  Specification of Letters Patent.  Patented Feb. 13, 1917.

No Drawing.  Application filed February 21, 1916. Serial No. 79,483.

*To all whom it may concern:*

Be it known that I, WILLIAM H. GILLEN, a citizen of the United States, and resident of Milwaukee, in the county of Milwaukee and State of Wisconsin, have invented new and useful Improvements in Processes for Decomposing Feldspar and other Potash-Bearing Silicious Minerals, of which the following is a description.

The invention relates to processes for decomposing feldspar or other potash bearing silicious minerals.

The invention consists more particularly in decomposing the feldspar or orthoclase or other potash rock in a commercially expeditious manner to form compounds from which the potash, silica and alumina in the rock may be obtained available for use in the industries and other commercial purposes and at a low cost.

The invention consists in the process hereinafter set forth and more particularly defined by claims at the conclusion hereof.

In nature feldspar and other potash bearing silicious minerals containing potash and alumina are found in large quantities and the following process has been devised for breaking up this rock into certain compounds from which the potash, silica and alumina may be separated.

The feldspar or other potash bearing silicious rock is ground and in this condition is mixed with a suitable quantity of alkaline borate or borax and an excess quantity of alkali carbonate or hydrate to which water is added and this mixture placed in a retort or digester where it is digested with heat and under pressure. A mixture of the different ingredients above mentioned which has been found suitable for carrying out the process is four parts of the ground rock, four parts of the alkali carbonate or hydrate, one to one and one-half parts of borax and twenty parts of water. However as these proportions may be varied I do not intend to limit myself to the exact proportions just specified. The rock itself is an alkali aluminum silicate together with impurities and when the solution of borax and alkali carbonate or hydrate are added and the mixture digested as above pointed out, the borate or borax breaks up this alkali aluminum silicate into alkali silicate and aluminum silicate and the alkali carbonate or hydrate, of which the hydrate is preferred, dissolves the alkali silicate as it is extracted from the rock by the borate. I have stated that the function of the borax is to break down the rock assisted by the alkali hydrate. Were it not for the borate the fixed alkali silicate and potassium aluminate in solution would react together to form a double salt of alkali aluminum silicate. The function of the borate is to prevent the formation of this double salt so that the compounds into which the rock has been broken up may be separated into their constituent elements by well known chemical methods.

After the digestion of the mixture is completed, the resulting mixture will contain aluminum silicate in dissolved and undissolved condition and alkali silicate in solution. The result of this process is a breaking down of the rock into compounds which may be separated into their constituent elements. These compounds may be further treated to separate the alumina, silica and potash.

A method of breaking down the compounds consists in subjecting the mixture containing the aluminum silicate and alkali silicate to the action of some suitable reagent and carbon dioxid has been found suitable for this purpose, though it is to be understood that other reagents can be used which will separate the potash and alumina. On the passing of the carbon dioxid into the mixture the aluminum silicate and silica in the alkali silicate is precipitated, leaving the alkali carbonate in solution with the borate or borax.

The aluminum silicate and silica may be separated out and the silica and alumina extracted therefrom by well-known chemical methods and the solution containing the alkali carbonate and the borate may be treated by well-known chemical methods to separate the potash from the solution, leaving the alkaline borate in solution from which the borate may be separated and used again.

By the term "fixed alkali carbonate or hydrate" is meant either potassium carbonate or hydrate or sodium carbonate or hydrate. Though potassium carbonate or hydrate, preferably the hydrate, is preferred in carrying out the process, sodium carbonate or hydrate, preferably the hydrate, may be used and it is to be noted in this instance that the soda is to be separated from the potash by crystallization after the addition of the carbon dioxid to the solution and the extraction of the silica and aluminum silicate therefrom.

The invention thus exemplifies a process for decomposing potash-bearing silicious minerals whereby the potash, silica and alumina may be extracted therefrom.

What I claim as my invention is:—

1. The process of decomposing potash-bearing silicious minerals which consists in mixing ground potash rock with alkaline borate, water and an excess of fixed alkali hydrate and heating this mixture to break the rock down into alkali silicate and aluminum silicate.

2. The process of decomposing potash-bearing silicious minerals which consists in mixing ground potash rock with borax, water and an excess of fixed alkali hydrate, and digesting this mixture with heat and under pressure to form a mixture containing alkali silicate and aluminum silicate.

3. The process for decomposing potash-bearing silicious minerals which consists in mixing ground potash rock with alkaline borate, water and an excess of fixed alkali hydrate, heating this mixture to form a mixture containing alkali silicate and aluminum silicate, adding to this mixture reagent to precipitate the aluminum silicate and silica and to keep the potassium salt in solution, and suitably recovering the alumina, silica and potassium salt.

4. The process of decomposing potash-bearing silicious minerals which consists in mixing ground potash rock with borax, water and an excess of fixed alkali hydrate, digesting this mixture with heat and under pressure to form a mixture containing alkali silicate and aluminum silicate, adding reagent to this mixture to precipitate the aluminum silicate and silica and to keep the potassium salt in solution, and suitably recovering the alumina, silica and potassium salt.

5. The process of decomposing potash-bearing silicious minerals which consists in mixing ground potash rock with borax, water and an excess of fixed alkali hydrate, digesting this mixture with heat and under pressure to form a mixture containing alkali silicate and aluminum silicate, adding carbon dioxid to this mixture to precipitate the aluminum silicate and silica and to keep the potassium carbonate in solution, whereby the rock is broken down into aluminum silicate, silica and alkaline carbonate from which the alumina, silica and carbonate may be separated.

In testimony whereof I affix my signature.

WILLIAM H. GILLEN.